United States Patent
Sakic

(10) Patent No.: US 10,848,439 B2
(45) Date of Patent: Nov. 24, 2020

(54) METHOD FOR OPERATING AN INDUSTRIAL AUTOMATION SYSTEM COMMUNICATION NETWORK COMPRISING A PLURALITY OF COMMUNICATION DEVICES, AND CONTROL UNIT

(71) Applicant: Siemens Aktiengesellschaft, Munich (DE)

(72) Inventor: Ermin Sakic, Munich (DE)

(73) Assignee: Siemens Aktiengesellschaft, Munich (DE)

(*) Notice: Subject to any disclaimer, the term of this patent is extended or adjusted under 35 U.S.C. 154(b) by 4 days.

(21) Appl. No.: 16/337,810

(22) PCT Filed: Sep. 29, 2016

(86) PCT No.: PCT/EP2016/073247
§ 371 (c)(1),
(2) Date: Mar. 28, 2019

(87) PCT Pub. No.: WO2018/059690
PCT Pub. Date: Apr. 5, 2018

(65) Prior Publication Data
US 2019/0245805 A1 Aug. 8, 2019

(51) Int. Cl.
*H04L 12/911* (2013.01)
*H04L 12/24* (2006.01)
(Continued)

(52) U.S. Cl.
CPC .......... *H04L 47/826* (2013.01); *G05B 19/042* (2013.01); *G05B 19/418* (2013.01);
(Continued)

(58) Field of Classification Search
CPC . H04L 41/04–08; H04L 41/0823–0836; H04L 41/0866; H04L 41/0893;
(Continued)

(56) References Cited

U.S. PATENT DOCUMENTS 7,430,735 B1 * 9/2008 Balakrishnan .......... G06F 8/656
717/173
8,553,553 B1 * 10/2013 Hardie ................ H04L 41/0803
370/229

(Continued)

FOREIGN PATENT DOCUMENTS

| WO | WO2014/108178 | 7/2014 |
| WO | WO2015/096761 | 7/2015 |
| WO | WO2016/033979 | 3/2016 |

OTHER PUBLICATIONS

PCT International Search Report and Written Opinion of International Searching Authority dated Jun. 1, 2017 corresponding to PCT International Application PCT/EP2016/073247 filed Sep. 29, 2016.

*Primary Examiner* — Brendan Y Higa
(74) *Attorney, Agent, or Firm* — Cozen O'Connor

(57) ABSTRACT

Method for operating a communication network that includes a communication devices and form part of an industrial automation system, wherein control units control functions of associated communication devices, where a prescribable proportion of system resources of an associated communication device is provide for a prescribable resource use duration for each control unit, when prescribable synchronization events occur, the control units synchronously detect state variables of the communication devices and adjust them to one another, the control units additionally determine, for at least one past resource use duration, how a determination time available for a path determination influences quality criterion changes for communication network paths to be determined, and determine a first correction (Continued)

value synchronization events based on the quality criterion changes, and the control units determine a second correction value for the synchronization events if inconsistent state variables are determined when the state variables are adjusted to one another.

16 Claims, 2 Drawing Sheets

(51) Int. Cl.
| | |
|---|---|
| H04L 12/715 | (2013.01) |
| H04L 12/755 | (2013.01) |
| H04L 12/26 | (2006.01) |
| H04L 12/851 | (2013.01) |
| H04L 12/751 | (2013.01) |
| H04L 12/721 | (2013.01) |
| G05B 19/418 | (2006.01) |
| G05B 19/042 | (2006.01) |

(52) U.S. Cl.
CPC ...... *H04L 41/0654* (2013.01); *H04L 41/0893* (2013.01); *H04L 41/12* (2013.01); *H04L 43/0823* (2013.01); *H04L 45/02* (2013.01); *H04L 45/021* (2013.01); *H04L 45/64* (2013.01); *H04L 45/70* (2013.01); *H04L 47/24* (2013.01); *H04L 47/828* (2013.01); *G05B 2219/25011* (2013.01); *H04L 41/042* (2013.01)

(58) Field of Classification Search
CPC ......... H04L 41/12–14; H04L 43/06–50; H04L 45/02–023; H04L 45/28; H04L 45/64; H04L 45/70; H04L 47/10; H04L 47/20; H04L 47/24–2491; H04L 47/805; H04L 47/826; H04L 49/55–557
See application file for complete search history.

(56) References Cited

U.S. PATENT DOCUMENTS

| | | | |
|---|---|---|---|
| 9,204,207 B2* | 12/2015 | deRuijter | H04Q 3/0083 |
| 9,935,831 B1* | 4/2018 | Wundsam | H04L 47/13 |
| 2013/0258847 A1* | 10/2013 | Zhang | H04L 47/41 |
| | | | 370/232 |
| 2013/0268686 A1 | 10/2013 | Wang et al. | |
| 2014/0269683 A1* | 9/2014 | Bhagavathiperumal | |
| | | | H04L 49/00 |
| | | | 370/355 |
| 2014/0355448 A1* | 12/2014 | Kawano | H04L 41/083 |
| | | | 370/236 |
| 2015/0139238 A1 | 5/2015 | Pourzandi et al. | |
| 2015/0163151 A1* | 6/2015 | Li | H04L 41/044 |
| | | | 370/236 |
| 2016/0050654 A1* | 2/2016 | Kanaumi | H04L 47/20 |
| | | | 370/336 |
| 2016/0057052 A1* | 2/2016 | Zhang et al. | H04L 47/33 |
| | | | 709/239 |
| 2016/0164739 A1* | 6/2016 | Skalecki | H04L 41/12 |
| | | | 370/389 |
| 2017/0201455 A1* | 7/2017 | Amulothu | H04L 12/4625 |
| 2017/0373929 A1* | 12/2017 | Pack | H04L 41/04 |

\* cited by examiner

METHOD FOR OPERATING AN INDUSTRIAL AUTOMATION SYSTEM COMMUNICATION NETWORK COMPRISING A PLURALITY OF COMMUNICATION DEVICES, AND CONTROL UNIT

CROSS-REFERENCE TO RELATED APPLICATIONS

This is a U.S. national stage of application No. PCT/EP2016/073247 filed Sep. 29, 2016, the content of which is incorporated herein by reference in its entirety.

BACKGROUND OF THE INVENTION

1. Field of the Invention

The present invention relates to industrial automation systems and, more particularly, to a control unit and method for operating an industrial automation system communication network comprising a plurality of communication devices

2. Description of the Related Art

Industrial automation systems are used to monitor, control and regulate technical processes, in particular in the field of manufacturing, process and building automation, and make it possible to operate control devices, sensors, machines and industrial installations in a manner which is intended to be as independent as possible and independent of human interventions. On account of a constantly increasing importance of information technology for automation systems comprising numerous networked control or computer units, methods for reliably providing functions distributed across an automation system for providing monitoring, control and regulation functions are becoming increasingly important.

Interruptions in communication connections between computer units of an industrial automation system or automation devices may result in undesirable or unnecessary repetition of the transmission of a service request. This causes additional utilization of communication connections of the industrial automation system, which may result in further system faults or errors. In addition, messages which have not been transmitted or which have not been completely transmitted may prevent an industrial automation system from changing to or remaining in a safe operating state, for example. This may finally result in failure of a complete production installation and costly production downtime. A particular problem regularly results in industrial automation systems from message traffic with a comparatively large number of, but relatively short, messages, thus intensifying the above problems.

Software defined networking is aimed at virtualizing communication network functions by functionally subdividing communication devices, such as routers or switches, into components assigned to a control plane and a data plane. The data plane comprises functions and components for forwarding data packets or frames in a port-by-port manner. In contrast, the control plane comprises management functions for controlling the forwarding or the components of the data plane. Open flow defines, for example, a standard for software-implemented control planes. An abstraction of hardware as virtual services makes it possible to dispense with the manual configuration of the hardware, in particular by providing programmable central control of network traffic.

US 2013/268686 A1 discloses a method for transmitting a request to set up a connection, in which an open flow switch transmits a message containing a parameter request to a configuration server in order to receive connection parameters from an open flow controller. In response to the message containing the parameter request, the open flow switch receives an IP address and a set of open flow connection parameters from the configuration server, where the set of open flow connection parameters comprises at least connection parameters of a first open flow controller. In accordance with the IP address and the set of open flow connection parameters of the first open flow controller, the open flow switch transmits a message containing a request to set up a connection to the first open flow controller. This makes it possible to automatically set up a connection between an open flow switch and an open flow controller.

WO 2014/108178 A1 describes a method for connecting a booting switch to a communication network by means of a central control unit, where the communication network comprises a multiplicity of switches that are controlled by the central control unit. In order to control the switches, the central control unit transmits data packets containing control information for the switches via the same communication paths as data packets containing useful data. The switches each comprise a pipeline in which forwarding rules for data packets are stored and which can be accessed via a local switch port. The communication paths for the data packets containing control information are set up by storing forwarding rules predefined by the central control unit in the pipelines of the switches. At least one of the switches has a selected port, via which the booting switch is connected to the communication network. A temporary communication path is used to store forwarding rules in the booting switch via the central control unit, where the temporary communication path comprises a communication path between the selected port and the central control unit and a communication path between the selected port and a local port of the booting switch. This temporary communication path makes it possible to access the pipeline of the booting switch.

WO 2015/096761 A1 describes data-traffic-oriented dynamic zone formation for software defined networking (SDN), in which a network component receives control information from one SDN controller of a plurality of SDN controllers. The network component determines available traffic planning zones and selects a local zone controller for each traffic planning zone determined. A master zone controller is selected based on the control information and a zone formation scheme, where the master zone controller and the local zone controllers are selected from the SDN controllers. In addition, the network component transmits information relating to local zone controllers, zone membership and the master zone controller to at least some of the SDN controllers.

In order to provide a scalable and failsafe control plane for software defined networking, SDN controller functions are distributed among a plurality of controller entities. Here, the individual controller entities must each have access to current system state information to perform controller functions that include, for example, path determination, data packet examination and filtering or use of communication network policies and guidelines. In particular, the system state information used in the individual controller entities for control tasks must be sufficiently consistent with one another and accordingly must be synchronized between the controller entities. On the other hand, these consistency requirements may result, in the case of an increasing number of controller entities, in an amount of synchronization that can ultimately no longer be mastered or that is unreasonably high.

SUMMARY OF THE INVENTION

It is therefore an object of the present invention to provide a control unit and an efficient and reliable method for operating an industrial automation system communication network comprising a plurality of communication devices, in which a plurality of control units each control functions of a plurality of associated communication devices.

This and other objects and advantages are achieved in accordance with the invention by a control unit and a method for operating an industrial automation system communication network comprising a plurality of communication devices, a plurality of control units each control functions of a plurality of associated communication devices. Here, a predefinable share of system resources of an associated communication device is made available for each control unit for a predefinable resource usage duration. During the resource usage duration in particular, the control units each determine communication network paths between selected communication devices via associated communication devices based on a quality measure taking into account respective available system resources and control routing or switching functions of the associated communication devices according to the determined communication network paths. The communication devices are preferably assigned to a software defined network comprising a communication control plane referred to as a control plane and a data transmission plane referred to as a data plane. In this case, the control units are assigned to the control plane, whereas the communication devices are assigned to the data plane. In particular, the communication devices may comprise routers or switches, where the control units can predefine, for example, flow tables from which routing tables and/or forwarding tables for communication devices assigned to the respective control unit are derived.

In accordance with the invention, the control units synchronously capture state variables of the communication devices when predefinable synchronization events occur and compare these state variables with one another. Here, the synchronization events comprise predefinable synchronization intervals and the resource usage duration is limited by successive synchronization events. The synchronization events are advantageously defined in a resource-specific and/or resource-type-specific manner, where port bandwidth, queue buffers, Dynamic Host Configuration Protocol (DHCP) address ranges, Virtual Local Area Network (VLAN) identifiers, routing table entries and/or forwarding table entries are examples of resource types. In accordance with the invention, the control units determine, for at least one past resource usage duration, which quality measure changes result for communication network paths to be determined based on a determination time available for path determination and determine a first correction value for the synchronization events based on the quality measure changes. Path costs are prepared, for example, as a quality measure for determining the communication network paths by the control units. In accordance with the invention, the control units determine inconsistent state variables when comparing the state variables with one another and determine a second correction value for the synchronization events based on inconsistent state variables. Changed synchronization events are specified for the control units based on the first and second correction values.

In accordance with a preferred embodiment of the method in accordance with the invention, the shares of system resources of the communication devices are made available for the control units by partitioning and assigning the system resources. Here, the system resources can be assigned to the control units in a partitioned and evenly distributed manner when the communication network is started up. In this case, the partitioning is changed in accordance with a respective resource use and/or request by the control units.

In addition, the synchronization events may comprise, in addition to synchronization intervals, threshold value exceedances with respect to a number of successful and/or failed resource requests by the control units and/or with respect to a frequency of mutually inconsistent state variables in the control units, requests for additional resource shares, releases of resource shares and/or correction values for synchronization events which are reported by control units. The second correction value is advantageously determined based on the frequency, extent and/or effects of inconsistent state variables. Here, the effects of inconsistent state variables may comprise, for example, additional path costs for a transition to a consistent system state or to a reference system state, system downtimes and/or a restricted system availability.

In accordance with another embodiment of the method in accordance with the invention, the share of system resources respectively available for a control unit within a defined upper limit and lower limit is requested by the control unit via control programs running on the control unit in accordance with the token principle. In addition, the share of system resources respectively available for a control unit is advantageously provided by the control unit in accordance with a transaction concept in control programs running on the control unit.

It is also an object of the present invention to provide a control unit for performing the method in accordance with the preceding embodiments, which is configured to control functions of a plurality of associated communication devices. Here, a predefinable share of system resources of an associated communication device is available for the control unit for a predefinable resource usage duration. In addition, the control unit is configured to determine, during the resource usage duration, communication network paths between selected communication devices via associated communication devices based on a quality measure taking into account respective available system resources and to control routing or switching functions of the associated communication devices in accordance with the communication network paths which have been determined.

In accordance with the invention, the control unit is further configured to capture state variables of the communication devices in sync with other control units when predefinable synchronization events occur and to compare the state variables with one another. Here, the synchronization events comprise predefinable synchronization intervals and the resource usage duration is limited by successive synchronization events. In addition, the control unit is configured to determine, for at least one past resource usage duration, which quality measure changes result for communication network paths to be determined based on a determination time available for path determination and to determine a first correction value for the synchronization events based on the quality measure changes. The control unit is also configured to determine inconsistent state variables when comparing the state variables and to determine a second correction value for the synchronization events based on inconsistent state variables, and to specify changed synchronization events based on the first and second correction values.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The present invention is explained in more detail below using an exemplary embodiment with reference to the drawing, in which.

DETAILED DESCRIPTION OF THE EXEMPLARY EMBODIMENTS

Figure 1:
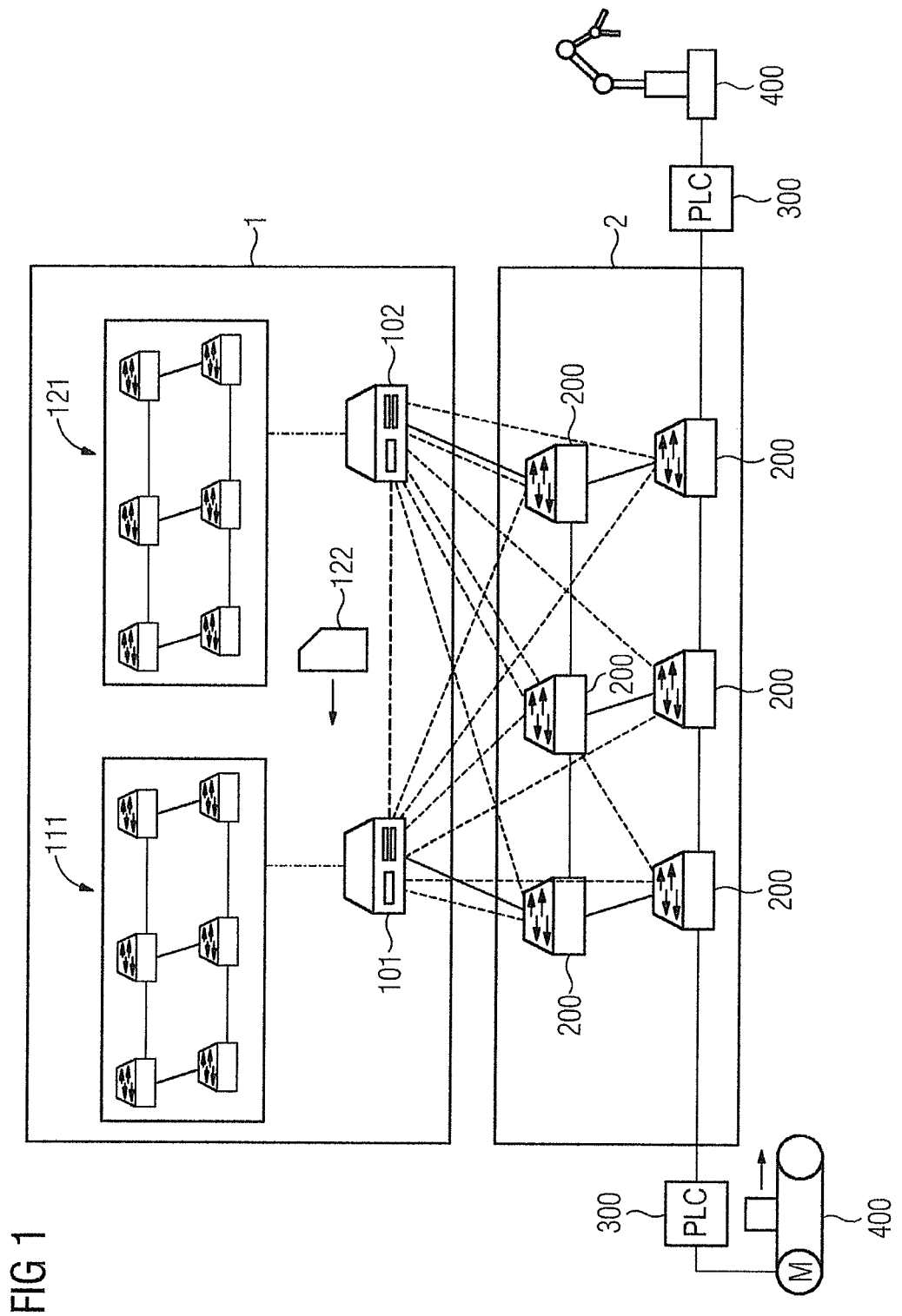
FIG. 1 shows an industrial automation system communication network comprising a plurality of communication devices and control units assigned to the latter in accordance with the invention.

The communication network of an industrial automation system illustrated in FIG. 1 comprises a plurality of communication devices 200 and a plurality of control units 101, 102. The communication devices 200 may be, for example, switches, routers or firewalls and may be used to connect programmable logic controllers 300 or input/output units of the industrial automation system. Programmable logic controllers 300 each comprise a communication module, a central unit and at least one input/output unit and are therefore likewise communication devices. A programmable logic controller 300 is connected to a switch or a router or additionally to a field bus, for example, via the communication module. The input/output unit is used to interchange control and measurement variables between the programmable logic controller 300 and a machine or an apparatus 400 controlled by the programmable logic controller 300. The central unit is provided, in particular, for the purpose of determining suitable control variables from captured measurement variables. The above components of the programmable logic controller 300 are connected to one another via a backplane bus system in the present exemplary embodiment.

In the present exemplary embodiment, the communication devices 200 are assigned to a software defined network (SDN) comprising a communication control plane referred to as a control plane and a data transmission plane referred to as a data plane. The control units 101, 102 (as SDN controllers) are assigned to the control plane, whereas the communication devices are assigned to the data plane. The control units 101, 102 predefine, for example, flow tables for switches or routers, from which routing tables or forwarding tables for communication devices 200 assigned to the respective control unit 101, 102 are derived.

The control units 101, 102 are generally configured to control functions of a plurality of associated communication devices 200. Here, a predefinable share of system resources of associated communication devices is respectively available for the control units 101, 102 for a predefinable resource usage duration, where a separate resource view 111, 121 with the shares of system resources is respectively provided for each control unit 101, 102. The shares of system resources of the communication devices are made available for the control units 101, 102 by partitioning and assigning the system resources. For example, the system resources can be assigned to the control units 101, 102 in a partitioned and evenly distributed manner when the communication network is started up. The partitioning is then changed in accordance with a respective resource use or request by the control units 101, 102.

In addition, during the resource usage duration, the control units each determine communication network paths between selected communication devices 200 via associated communication devices 200 based on path costs taking into account respective available system resources and control routing or switching functions of the associated communication devices 200 in accordance with the determined communication network paths. The control units 101, 102 also synchronously capture available state variables of the communication devices 200 when predefinable synchronization events occur and compare these state variables with one another. The synchronization events comprise predefinable synchronization intervals, where the resource usage duration is limited by successive synchronization events. The synchronization events are preferably defined in a resource-specific or resource-type-specific manner, where port bandwidth, queue buffers, DHCP address ranges, VLAN identifiers, routing table entries or forwarding table entries are resource types, for example.

In the present exemplary embodiment, the synchronization events comprise, in addition to synchronization intervals, (i) threshold value exceedances (ii) with respect to a number of successful or failed resource requests by the control units or (iii) with respect to a frequency of mutually inconsistent state variables in the control units, (iv) requests for additional resource shares, releases of resource shares and (v) correction values for synchronization events reported by other control units 300.

Figure 2:
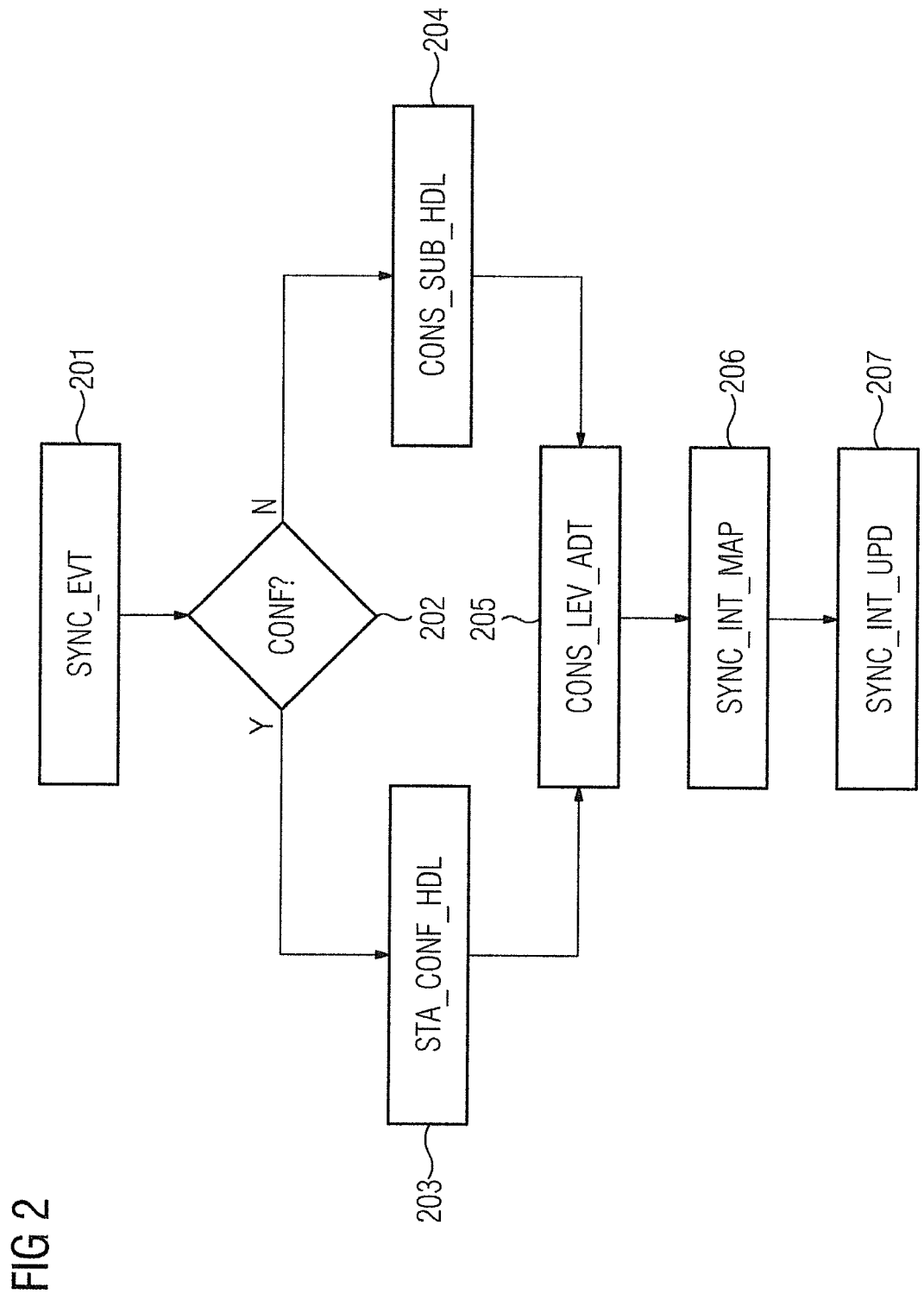
FIG. 2 shows a flowchart for adapting synchronization events for the control units of the communication system illustrated in FIG. 1.

In accordance with the flowchart illustrated in FIG. 2 for adapting synchronization events for the control units 101, 102, in response to a message 122 relating to a synchronization event which is received by a control unit 101 from another control unit 102 according to step 201, a check is performed to determine whether a consistency conflict between state variables captured in databases of the control units 101, 102 (step 202) exists. If no consistency conflict exists, the respective control unit 101 determines, for a history of past resource usage durations, which path cost changes result for communication network paths to be determined based on a determination time available for path determination (step 204), where the determination time is limited by the respective synchronization interval. Based on the path cost changes, an SDN application running on the respective control unit 101 determines a first correction value for the synchronization events that reflects costs Cs for a suboptimally selected synchronization interval. High costs Cs for a suboptimally selected synchronization interval indicate that no appropriate accuracy improvements can be expected for a path cost determination through a longer available determination time for implementing the path cost determination.

If, according to step 202, there is a consistency conflict, the SDN application running on the respective control unit

101 determines a second correction value for the synchronization events based on inconsistent state variables, where the second correction value reflects costs Cc for conflict resolution. In particular, the second correction value is determined based on the frequency, extent and effects of inconsistent state variables. Here, the effects of inconsistent state variables comprise (i) additional path costs for a transition to a consistent system state or to a reference system state, (ii) system downtimes and (iii) a restricted system availability.

Based on the first correction value determined according to step 204 and based on the second correction value determined according to step 203 and based on the costs Cs for suboptimally selected synchronization intervals and the costs Cc for conflict resolution, the SDN application running on the respective control unit 101 specifies changed synchronization events or intervals for the control units, to be precise initially in the form of an adapted consistency level (step 205). According to step 205, this adapted consistency level is then mapped to a new or updated synchronization interval within which the respective control units 101, 102 control functions of associated communication devices 200 based on locally available state variables. The new or updated synchronization interval is finally forwarded to all control units to be involved for acceptance in accordance with step 207.

The share of system resources respectively available for a control unit 101, 102 can be requested by the control unit within a defined upper limit and lower limit by means of SDN applications running on the control unit according to the token principle. In accordance with a preferred embodiment, the share of system resources respectively available for a control unit is provided by the control unit in SDN applications running on the control unit in accordance with a transaction concept.

Thus, while there have been shown, described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for operating an industrial automation system communication network comprising a plurality of communication devices, a plurality of control units each controlling functions of a plurality of associated communication devices, and a predefinable share of system resources of an associated communication device being made available for each control unit for a predefinable resource usage duration, the method comprising:

determining, by each of the plurality of control units, during the resource usage duration, communication network paths between selected communication devices via associated communication devices based on a quality measure taking into account respective available system resources and control routing or switching functions of associated communication devices in accordance with the determined communication network paths;

capturing synchronously, by the plurality of control units, state variables of the communication devices when predefinable synchronization events occur and comparing said state variables with one another, the synchronization events comprising predefinable synchronization intervals and the resource usage duration is limited by successive synchronization events;

determining, by the plurality of control units, for at least one past resource usage duration, which quality measure changes result for communication network paths to be determined based on a determination time available for path determination and determining a first correction value for the synchronization events based on the quality measure changes;

determining, by the plurality of control units, inconsistent state variables when comparing the state variables with one another and determining a second correction value for the synchronization events based on inconsistent state variables; and specifying changed synchronization events for the control units based on the first and second correction values.

2. The method as claimed in claim 1, wherein the communication devices are assigned to a software defined network comprising a communication control plane referred to as a control plane and a data transmission plane referred to as a data plane; wherein the plurality of control units are assigned to the control plane; and wherein the communication devices are assigned to the data plane.

3. The method as claimed in claim 2, wherein the communication devices comprise at least one of (i) routers and (ii) switches; and wherein the control units can predefine flow tables from which at least one of (i) routing tables and (ii) forwarding tables for communication devices assigned to the respective control unit are derived.

4. The method as claimed in claim 3, wherein shares of system resources of the communication devices are made available for the plurality of control units by partitioning and assigning the system resources.

5. The method as claimed in claim 2, wherein shares of system resources of the communication devices are made available for the plurality of control units by partitioning and assigning the system resources.

6. The method as claimed in claim 1, wherein shares of system resources of the communication devices are made available for the plurality of control units by partitioning and assigning the system resources.

7. The method as claimed in claim 6, wherein the system resources are assigned to the control units in a partitioned and evenly distributed manner when the industrial automation system communication network is started up; and wherein the partitioning is changed in accordance with at least one of (i) a respective resource use and (ii) a request by the plurality of control units.

8. The method as claimed in claim 1, wherein the synchronization events comprise, in addition to synchronization intervals, threshold value exceedances with respect to at least one of (i) a number of successful resource and/or failed resource requests by the control units, (ii) a frequency of mutually inconsistent state variables in the control units, (iii) requests for additional resource shares, (iv) releases of resource shares and (v) correction values for synchronization events which are reported by control units.

9. The method as claimed in claim 1, wherein the synchronization events are defined in at least one of (i) a resource-specific and (ii) resource-type-specific manner.

10. The method as claimed in claim 9, wherein at least one of (i) port bandwidth, (ii) queue buffers, (iii) dynamic host configuration protocol (DHCP) address ranges, (iv) virtual local area network (VLAN) identifiers, (v) routing table entries and (vi) forwarding table entries are resource types.

11. The method as claimed in claim 1, wherein path costs are prepared as a quality measure for determining the communication network paths by the plurality of control units.

12. The method as claimed in claim 1, wherein the second correction value is determined based on at least one of (i) frequency, (ii) extent and (iii) effects of inconsistent state variables.

13. The method as claimed in claim 12, wherein the effects of inconsistent state variables comprise at least one of (i) additional path costs for a transition to one of a consistent system state and a reference system state, (ii) system downtimes and (iii) a restricted system availability.

14. The method as claimed in claim 1, wherein a share of system resources respectively available for a control unit within a defined upper limit and lower limit is requested by a control unit of the plurality of control units via control programs running on the control unit in accordance with a token principle.

15. The method as claimed in claim 1, wherein a share of system resources respectively available for a control unit of the plurality of control units is provided by the control unit in accordance with a transaction concept in control programs running on the control unit.

16. A control unit comprising:
a processor; and
memory;
wherein the processor is configured to:

control functions of a plurality of associated communication devices, a predefinable share of system resources of an associated communication device being available for the control unit for a predefinable resource usage duration, determine, during the resource usage duration, communication network paths between selected communication devices via associated communication devices based on a quality measure taking into account respective available system resources and control at least one of (i) routing and (ii) switching functions of the associated communication devices in accordance with the determined communication network paths, capture state variables of the communication devices in sync with other control units when predefinable synchronization events occur and compare said state variables with one another, the synchronization events comprising predefinable synchronization intervals and the resource usage duration being limited by successive synchronization events, determine, for at least one past resource usage duration, which quality measure changes result for communication network paths to be determined based on a determination time available for path determination and determine a first correction value for the synchronization events based on the quality measure changes, determine inconsistent state variables when comparing the state variables and determine a second correction value for the synchronization events based on inconsistent state variables, and specify changed synchronization events based on the first and second correction values.

* * * * *